United States Patent [19]

Matthews

[11] Patent Number: 5,782,072
[45] Date of Patent: Jul. 21, 1998

[54] CROP TRACKING ROW UNITS ON COTTON HARVESTERS

[76] Inventor: H. Wayne Matthews, P.O. Box 225, Denison, Tex. 75021

[21] Appl. No.: 680,213

[22] Filed: Jul. 11, 1996

[51] Int. Cl.⁶ ........................................... A01D 46/08
[52] U.S. Cl. ........................ 56/10.2 F; 56/28; 56/DIG. 2; 56/DIG. 15
[58] Field of Search ............... 56/10.2 A, 10.2 F, 56/10.2 R, 28, 37, DIG. 2, DIG. 15; 172/2, 4, 4.5

[56] References Cited

U.S. PATENT DOCUMENTS

| | | | |
|---|---|---|---|
| 4,896,491 | 1/1990 | Warnsholz et al. | 56/28 |
| 5,019,983 | 5/1991 | Schutten et al. | 56/10.2 F X |
| 5,099,635 | 3/1992 | Butkovich et al. | 56/28 X |
| 5,181,572 | 1/1993 | Andersen et al. | 56/10.2 F X |
| 5,237,802 | 8/1993 | Fachini et al. | 56/28 X |
| 5,343,677 | 9/1994 | Covington et al. | 56/10.2 F |

*Primary Examiner*—Terry Lee Melius
*Assistant Examiner*—Robert Pezzuto
*Attorney, Agent, or Firm*—Jerry C. Ray

[57] ABSTRACT

On an automatically-steered cotton harvester, a sensor follows a crop row of cotton plants and sends a signal to a computer controller when the crop row changes its position relative to a row unit on the harvester. The computer controller calculates the amount of deviation between the crop row and the center of the row unit, and sends a control signal to a solenoid valve to actuate a hydraulic cylinder, or to a relay to actuate an electric motor, to laterally move the row unit along a tool bar on which it is mounted to more closely align the row unit with the crop row.

7 Claims, 4 Drawing Sheets

5,782,072

1

CROP TRACKING ROW UNITS ON COTTON HARVESTERS

BACKGROUND OF THE INVENTION:

1. Field of the Invention

This invention relates to cotton harvesters having moveable or adjustable row units, and in particular to such harvesters having row units whose spacing is automatically adjusted responsive to row-location sensors.

2. Description of the Related Art

Ninety-nine percent of cotton harvesting in the U.S. is done by machine. The machines are complex and expensive, harvesting cotton from several rows of plants at once. Two types of harvesters are used; cotton strippers remove the entire boll from the plant, and cotton pickers use drum-mounted revolving spindles that wind up and gather only the lint and seeds from the open bolls. The present invention is described primarily in terms of cotton pickers, but also may be used on cotton strippers. Four-row cotton pickers are the most commonly used; about 80% of new cotton pickers manufactured today are in a four-row configuration.

In order for the machines to operate at highest efficiency, i.e., to remove the maximum number of cotton bolls from each plant, the machine's individual picking units must be carefully aligned with the crop rows. The objective is for each row of cotton plants to enter a row unit (or picking head) as nearly as possible in the center; a deviation of as little as one or two inches from center results in a marked decrease in the amount of cotton harvested.

The phrase "row unit," as used herein, means one of the picking drum assemblies, including the housing and associated equipment, which is mounted on a tool bar at the front of harvester. The front end of a row unit has two large tapered fenders which guide the plants into the drums. A type of cotton picker currently in wide use has a front drum and a rear drum in each row unit assembly; both drums pass along the same side of the plant. With this arrangement, proper alignment with the row is especially critical.

A problem with row alignment arises because the machines used to harvest cotton are not always compatible with the machines used for planting. Between each pass of the planter is a "guess row" whose spacing varies relative to the other rows, due to variations in the tractor's path across the field as it pulls the planter. It is not uncommon for the spacing of the guess row to vary 3–6 inches relative to the other rows. There is a trend toward larger planters; six- and ten-row planters are in common use. These planters result in a row configuration not matched by four-row harvesters.

Many modern cotton harvesters use some type of automatic guidance system which senses the location of one crop row and feeds signals to the steering system to keep the harvester aligned with that row. Where the group of rows being harvested includes a guess row, however, the result is that one or more rows enter their respective row units off-center, decreasing the yield of cotton harvested. Variations in row spacing decrease yields whether the harvester is steered automatically or manually. The problem is especially acute for custom harvesters, who move their harvesting machinery from farm to farm and who must cope with various planting configurations. What is needed, therefore, is a cotton harvester having adjustable row units, with the position or spacing of the row units responsive to the spacing of the rows as they enter the row units.

SUMMARY OF THE INVENTION

The invention includes an apparatus and related method for automatically adjusting the position of row units on a tool bar of a cotton harvester. A sensor, similar to that used for automatic guidance systems for harvesters, detects the location of a row of plants (the "crop row"). A signal from the sensor is sent to a computer controller, which determines which direction the associated pair of row units needs to be moved. The controller is mounted in the cab of the harvester. For purposes of this description, a sensor for an electronic guidance system (EGS) is assumed to be associated with row unit three, and row unit three is considered fixed to the tool bar.

The output of the computer controller is a pulsed signal to a solenoid which controls a hydraulic cylinder; the hydraulic cylinder laterally adjusts the position of a pair of row units. Where row unit three is fixed as described above, row units one and two move as a pair in response to the controller signal, and row unit four moves independently of row unit three. Electric motors rather than hydraulics may be used to move the row units. In the latter embodiment, the controller signal actuates an electrical motor-control relay rather than a solenoid-actuated hydraulic valve.

Given the above, it is an object of this invention to increase the efficiency of cotton harvesters by providing an apparatus and method for continually centering the row units on a crop row, even where the rows vary in spacing.

A further object is to provide such an adjustment mechanism which will work in conjunction with an automatic guidance system on a cotton harvester.

Another object is to provide a row unit centering mechanism which may be operated either in automatic or manual mode.

Further objects are to achieve the above with devices that are sturdy, compact, durable, lightweight, safe, efficient, energy conserving, and reliable, yet not requiring skilled personnel to install, operate, and maintain.

The specific nature of the invention, as well as other objects, uses, and advantages thereof, will clearly appear from the following description and from the accompanying drawings, the different views of which are not necessarily scale drawings.

CATALOG OF THE ELEMENTS:

To aid in the correlation of the elements of the invention to the exemplary drawings, the following catalog of the elements is provided:

10 harvester  20 solenoid-actuated valve
12 tool bar  21 hydraulic line
14 row unit  22 hydraulic cylinder
16 sensor  17 sensor signal path
18 controller  23 link to row unit
19 controller signal path  24 blocking solenoid

Figure 1:
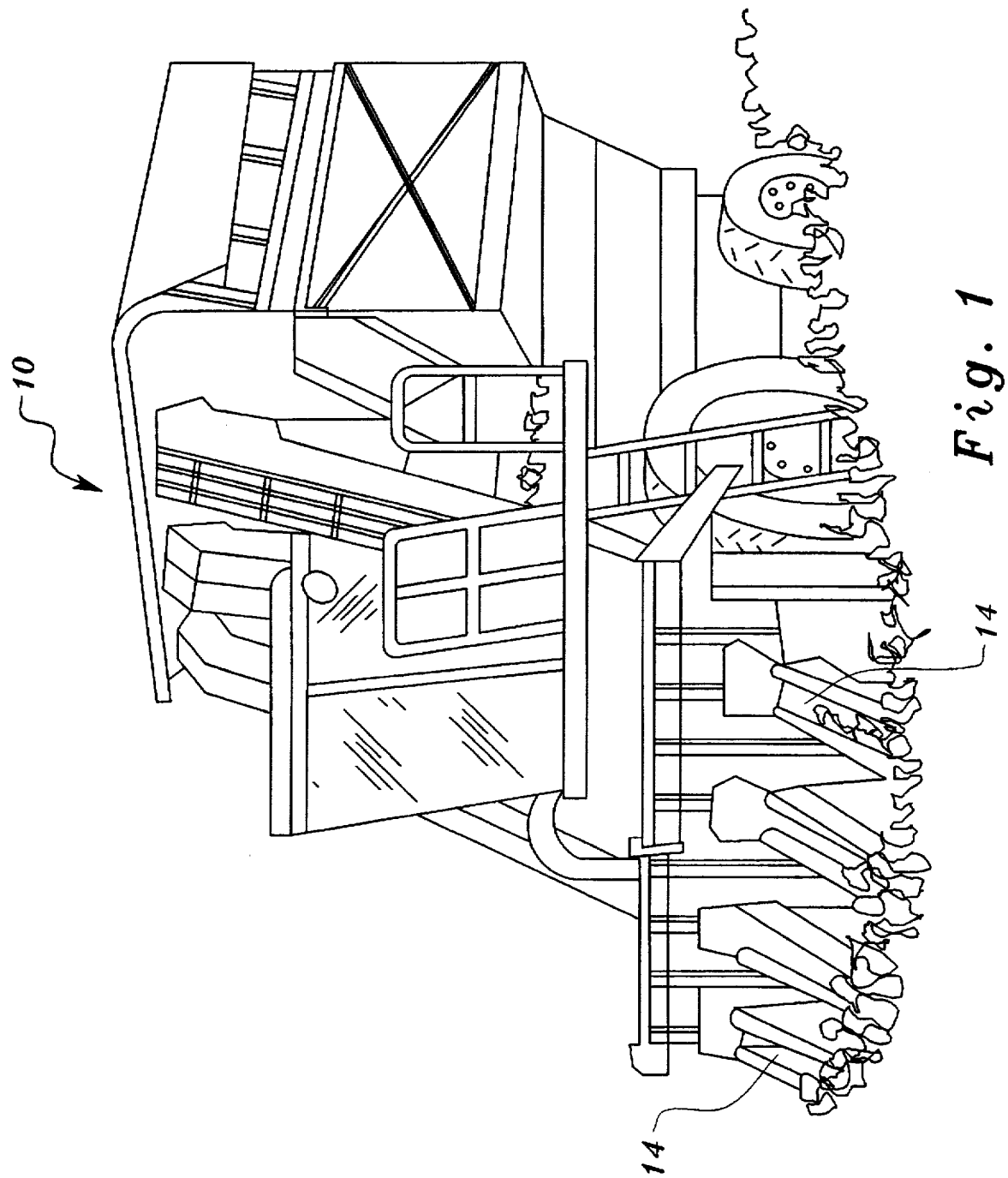
FIG. 1 is a perspective of a 4-row cotton harvester showing the operator's cab and the picking units at the front of the machine.

DESCRIPTION OF THE PREFERRED EMBODIMENTS:

Referring to the drawings, FIG. 1 illustrates a cotton harvester 10 having row units 14 mounted on a tool bar 12. In a four-row picker, the row units are numbered one through four, with unit number one on the outside left side, relative to the operator. Row units 14 are moveable along the tool bar 12, being mounted on teflon-coated slides or on rollers. Where the harvester has an automatic electronic guidance system (EGS), the sensors for the EGS are generally associated with row unit number three, and unit three is fixed to the tool bar.

Figure 2:
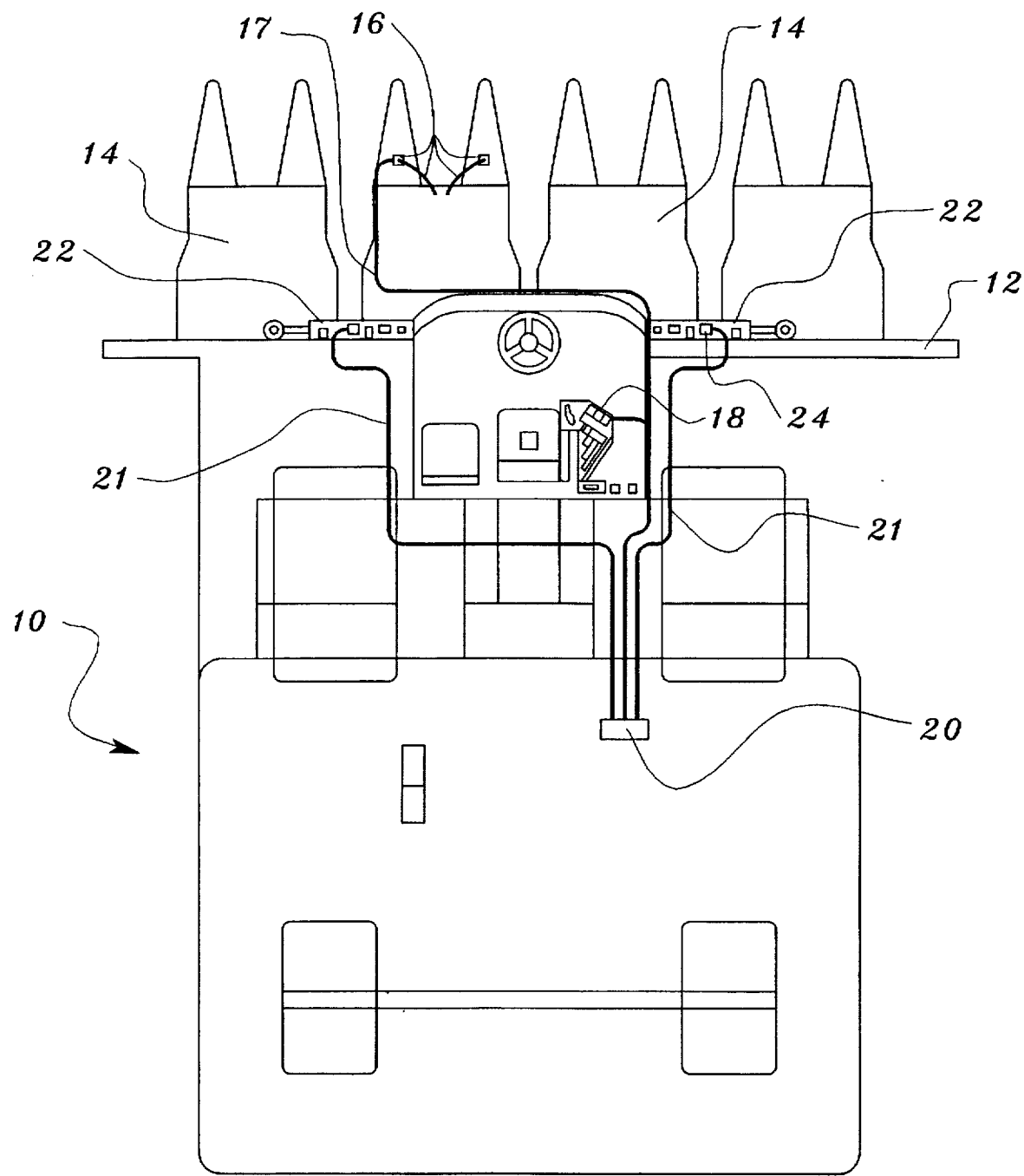
FIG. 2 is a schematic illustration of a cotton harvester in top plan view, showing the row units and their associated hydraulic cylinders.
Figure 3:
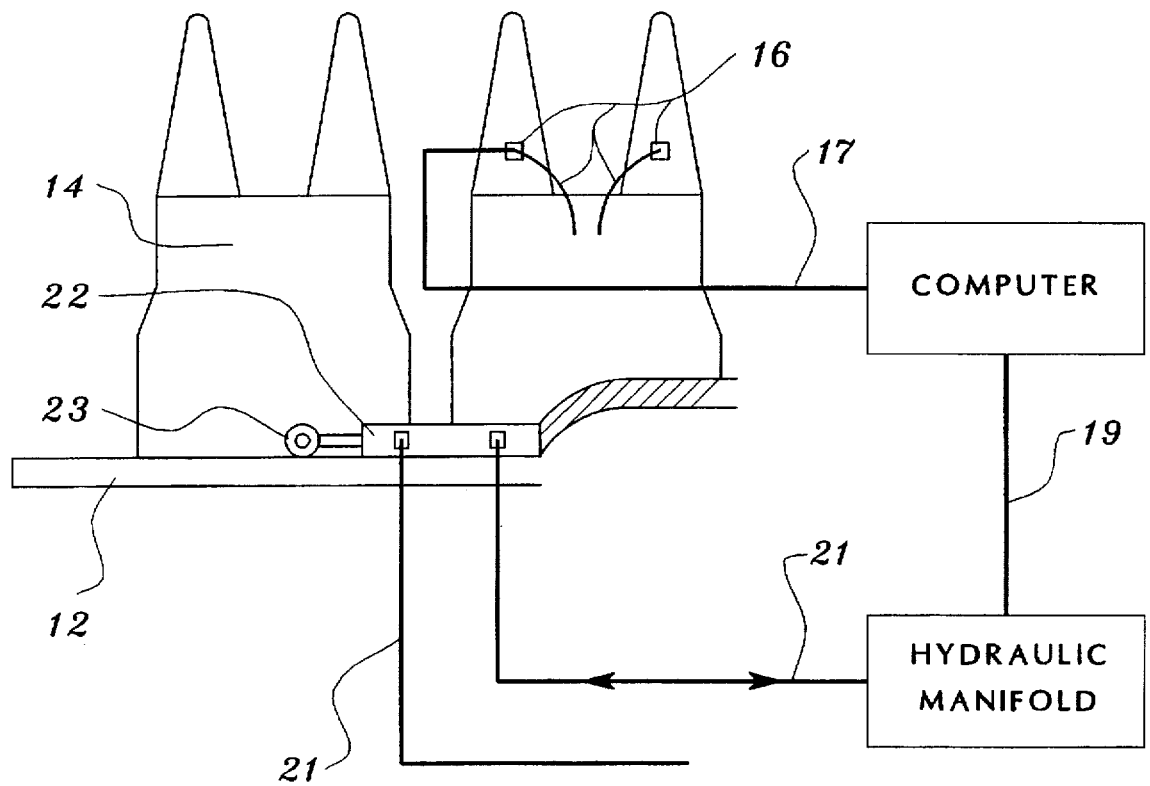
FIG. 3 is a schematic illustration of two row units with an associated crop row sensor, computer, hydraulic controls, and hydraulic cylinder.
Figure 4:
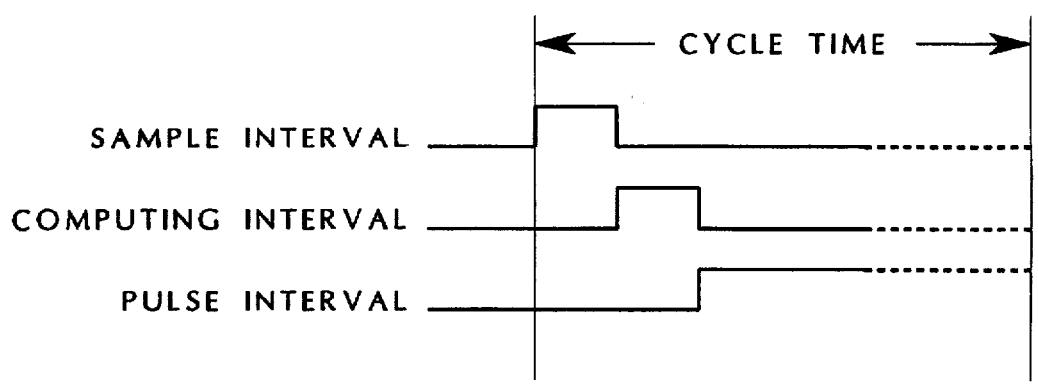
FIG. 4 is a sequence chart showing the various operations during one cycle interval.

Referring to FIG. 2 and FIG. 3, a sensor 16 for the automatic row unit adjusting system is associated with row unit number two. The sensor 16 may be of various types; the type illustrated includes moveable wands or fingers attached to a framework; the crop row passes between the wands so that the stalks contact the wands. Where a variation in row spacing is encountered, one of the sensor wands will be pushed off-center, while the other follows in a relaxed position. Movement of the offset wand is converted by an encoder to an electrical signal which is transmitted to the computer controller 18, located in the harvester's cab. Other types of sensors include those having motionless mechanical sensors, optical sensors, and the like. Transmission of the signal may be along a conductor or by wireless (radio-frequency) transmission. Where the sensor is connected by a wiring harness as shown in FIG. 3 and FIG. 4, sensor signal path 17 connects sensor 16 to computer controller 18.

The computer controller 18 calculates the amount by which the crop row has deviated from the center of the row unit 14, and sends a signal to operate a solenoid-actuated valve 20 controlling the hydraulic cylinder 22. Controller signal path 19, illustrated in FIG. 3, conducts the signal from computer 18 to solenoid valve 20. Referring to FIG. 4, the sequence of operations within one cycle interval is shown. At the beginning of each cycle, the computer accepts data from the sensor; during the next interval the computer calculates the amount of deviation, if any, between crop row and picking unit; next, the computer sends a variable-length electrical pulse to a solenoid valve. The pulse length is directly proportional to the amount of calculated deviation between crop row and row unit; a calculated deviation value of zero results in no pulse being sent to the solenoid valve.

The length of a cycle interval may vary, the present embodiment of the invention uses a cycle of about one second. It has been found that the minimum length of a useful pulse is about 250 ms; keeping the solenoid valve open for a shorter length of time has little effect, due to lag in the hydraulic circuit and in the mechanical linkages of the system. Each pulse will operate hydraulic valve 20 briefly to activate hydraulic circuit 21; hydraulic pressure is supplied by a pump, not shown. A pulse of a particular length causes the associated hydraulic cylinder to move a predetermined amount; then the valve closes until the next pulse. One end of each hydraulic cylinder is linked to a row unit by link 23, and the other end is attached to the frame of the harvester, as shown in FIG. 3. Moving in either direction responsive to signals from the controller, the hydraulic cylinder 22 moves the row unit 14 laterally along the tool bar 12 until the crop row is centered between the sensor wands. Row units are moveable along the tool bar, within certain constraints, by being mounted on either teflon-coated pads or on rollers.

Figure 5:
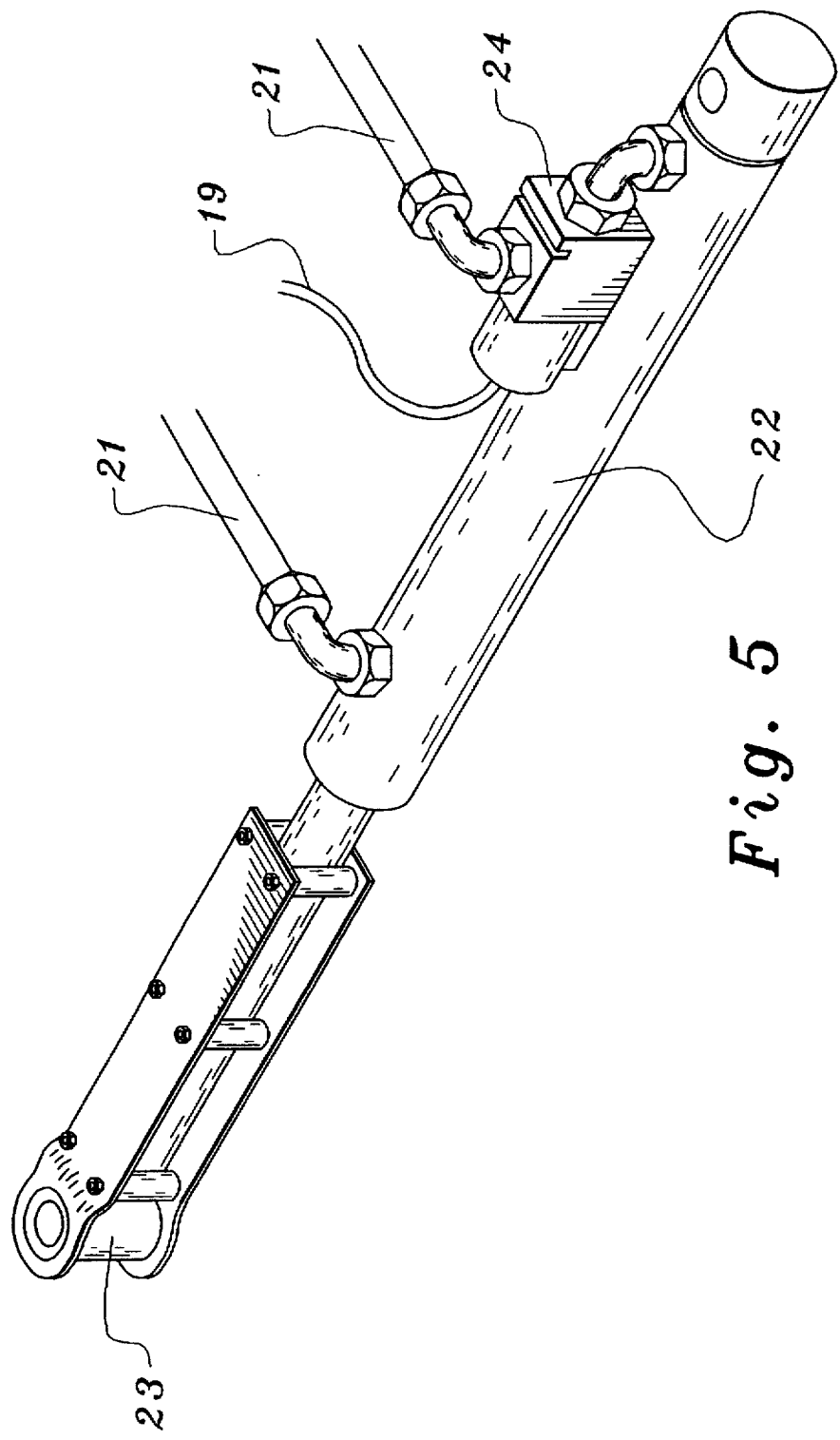
FIG. 5 is a detail of a hydraulic cylinder showing a blocking valve.

Some cotton harvesters have factory-installed hydraulic cylinders, called "service cylinders," to spread the units 14 apart for servicing. One service cylinder is attached to units one and two, which are linked together and move as a pair. Another service cylinder is attached to unit four, which is linked to unit three. The pairs of row units are moved apart by the hydraulic cylinders by activation of a service switch. The service switch activates solenoid valves to feed hydraulic fluid to the cylinders. As described above, however, unit three is fixed to the tool bar while the machine is in operation, to enable the automatic guidance system to operate properly. One embodiment of the invention is as an application to harvesters equipped with service cylinders. In this embodiment, the service cylinder controlling row units three and four must be blocked from operating. To prevent unit four from moving responsive to signals from the computer controller, a blocking solenoid 24, shown in FIG. 5, is added to the hydraulic circuit for unit four. The blocking solenoid prevents signals from the computer controller from moving unit four, but allows normal operation of the cylinder for servicing needs. Units one and two, which are mechanically linked, are thus the only two units which move responsive to signals from the crop-tracking system.

The restrictive description and drawing of the specific examples above do not point out what an infringement of this patent would be, but are to enable one skilled in the art to make and use the invention. Various modifications can be made in the construction, material, arrangement, and operation, and still be within the scope of the invention. The limits of the invention and the bounds of the patent protection are measured by and defined in the following claims.

I claim as my invention:

1. An apparatus for automatically adjusting a row unit position on a tool bar of a cotton harvesting machine, comprising:

a sensor to determine a crop row location relative to said row unit position, said sensor responsive to changes in said crop row location, a signal generated by said sensor, said signal generated by said sensor containing information on a magnitude of displacement of said sensor, means, including an electronic computer, for determining from said signal a deviation of said row unit position from said crop row location, and means responsive to said deviation for laterally adjusting said row unit position to minimize said deviation.

2. The invention as described in claim 1, said means for laterally adjusting said row unit position further comprising:

a hydraulic cylinder connected to said row unit to move said row unit laterally along a tool bar supporting said row unit, a solenoid valve controlling a flow of hydraulic fluid to and from said hydraulic cylinder, and said solenoid valve responsive to a signal from said electronic computer.

3. The invention as described in claim 2, further comprising:

a blocking solenoid to prevent movement of at least one row unit while another row unit is moving responsive to said signal from said electronic computer.

4. The invention as described in claim 1, wherein said means for laterally adjusting said row unit position further comprises:

an electric motor connected to said row unit to move said row unit laterally along a tool bar supporting said row unit, a switch controlling a direction of movement of said motor, and said switch responsive to a signal from said electronic computer.

5. The invention as described in claim 4, wherein said electric motor is a linear electric motor.

6. A method of automatically adjusting a row unit position on a tool bar of a cotton harvesting machine, comprising the following steps:

sensing a location of a crop row by means of a crop row sensor, sending an electronic signal from a crop row sensor to a controller, electronically calculating in said controller a deviation of a crop row from a row unit, generating in said controller a control signal for controlling a position of a row unit on a tool bar of a cotton harvester, sending said control signal to a solenoid valve controlling a hydraulic cylinder attached to said row unit, a position of said row unit on said tool bar being determined by said hydraulic cylinder, and adjusting said position of a row unit responsive to said control signal to decrease said deviation.

7. The method as described in claim 6, the step of sending said control signal further comprising:

sending said control signal to an electric motor attached to said row unit, a position of said row unit on said tool bar being determined by said electric motor.

* * * * *